(12) United States Patent
Knausdorf et al.

(10) Patent No.: US 11,766,874 B2
(45) Date of Patent: Sep. 26, 2023

(54) MATRIX ADDRESSABLE, LINE LASER, MARKING SYSTEM USING LASER ADDITIVES

(71) Applicant: Xerox Corporation, Norwalk, CT (US)

(72) Inventors: Peter J. Knausdorf, Henrietta, NY (US); Anthony S. Condello, Webster, NY (US); Jack T. Lestrange, Macedon, NY (US); Palghat S. Ramesh, Pittsford, NY (US); Joseph C. Sheflin, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 83 days.

(21) Appl. No.: 17/531,098

(22) Filed: Nov. 19, 2021

(65) Prior Publication Data

US 2023/0158811 A1   May 25, 2023

(51) Int. Cl.
*B41J 2/47* (2006.01)
*G02B 26/08* (2006.01)
(Continued)

(52) U.S. Cl.
CPC .............. *B41J 2/471* (2013.01); *B41M 5/267* (2013.01); *G02B 7/1815* (2013.01); *G02B 26/0833* (2013.01)

(58) Field of Classification Search
CPC ............ B23K 2101/40; B23K 26/0622; B23K 26/067; B23K 26/0676; B23K 26/066; B23K 26/352; B23K 2103/56; B23K 26/0732; B23K 26/362; B23K 26/40; B23K 2103/50; B23K 26/0006; B23K 26/0604; B23K 26/0626; B23K 26/0648; B23K 26/0853; B23K 26/38; B23K 2101/007; B23K 26/0823; B23K 26/0608; B23K 26/0624; B23K 26/0665; B23K 26/073; B23K 26/0736; B23K 26/082; B23K 26/10; B23K 26/103; B23K 26/12;
(Continued)

(56) References Cited

U.S. PATENT DOCUMENTS 5,343,271 A * 8/1994 Morishige ........... G03F 7/70791
355/70
8,508,791 B1 * 8/2013 Paul ........................ B41J 2/465
358/475
(Continued)

*Primary Examiner* — Negussie Worku
(74) *Attorney, Agent, or Firm* — Caesar Rivise, PC

(57) ABSTRACT

Apparatus and method for using a line laser (LL) to quickly mark a substrate or media by utilizing a laser additive on/within the substrate/media, which greatly reduces the power requirement for marking the substrate/media. The combination of the LL wide swath (>305 mm) and the improved media/surface sensitivity to laser wavelength allows the LL marking system to achieve faster marking than other systems. The LL is mounted over a transport which transports the sensitized substrate/media past the LL for marking. The desired image is projected from the LL line by line in synch with the moving media and once the media passes the beam path of the LL, marking is complete. In this case, the media has been physically-altered via the heat generated by the LL interacting with the photosensitized media and is permanent. A second method would use a photosensitizing agent coated on top of the media to be marked.

23 Claims, 3 Drawing Sheets

(51) Int. Cl.
*G02B 7/18* (2021.01)
*B41M 5/26* (2006.01)

(58) Field of Classification Search
CPC .... B23K 26/127; B23K 26/36; B23K 26/361; B23K 26/364; G02F 1/13439; G03F 7/70291; G03F 7/0002; G03F 7/20; G03F 9/7023; G03F 9/7042; G03F 7/7005; G03F 7/70283; G03F 7/70558; G03F 7/70625; G03F 7/70791; G03F 7/2004; G03F 7/2053; G03F 7/70025; G03F 7/70275; G03F 7/70308; G03F 7/70358; G03F 7/70391; G03F 7/70508; G03F 7/70833; G03F 7/7085; G02B 26/101; G02B 27/0927; G02B 27/0944; G02B 27/0955; G02B 26/10; G02B 27/1086; G02B 5/1819; H04N 1/1906; H04N 1/193; H05K 1/0269; H05K 2201/09781; H05K 2203/163; H05K 3/0082; H05K 1/097; H05K 2203/013; H05K 2203/1131; H05K 3/064; H05K 3/125; H05K 3/1283; H01S 3/005; H01S 3/0071
USPC .......................................................... 358/1.7
See application file for complete search history.

(56) References Cited

U.S. PATENT DOCUMENTS

| | | | |
|---|---|---|---|
| 10,261,286 B2 | 4/2019 | Zirilli et al. | |
| 10,594,887 B1* | 3/2020 | Calamita | H04N 1/1135 |
| 11,318,733 B2* | 5/2022 | Hirsch | B41N 3/08 |
| 2002/0141024 A1* | 10/2002 | Retschke | G03F 7/70383 |
| | | | 359/196.1 |
| 2004/0241340 A1* | 12/2004 | Sato | G02B 26/10 |
| | | | 427/553 |
| 2009/0128615 A1* | 5/2009 | Miller | B41M 5/26 |
| | | | 347/232 |
| 2010/0272961 A1* | 10/2010 | Costin, Jr. | B23K 26/082 |
| | | | 428/156 |
| 2013/0188229 A1* | 7/2013 | Paul | B41F 7/02 |
| | | | 358/475 |
| 2013/0265350 A1* | 10/2013 | Costin, Sr. | B41J 3/407 |
| | | | 347/2 |
| 2015/0037984 A1* | 2/2015 | Zhang | B23K 26/067 |
| | | | 438/799 |
| 2015/0050468 A1* | 2/2015 | Reichenbach | B23K 26/0006 |
| | | | 347/225 |
| 2020/0285159 A1* | 9/2020 | Tsutsumi | B29C 31/044 |
| 2020/0350156 A1* | 11/2020 | Ahn | B23K 26/0604 |
| 2022/0011566 A1* | 1/2022 | Maeda | G02B 27/18 |

* cited by examiner

MATRIX ADDRESSABLE, LINE LASER, MARKING SYSTEM USING LASER ADDITIVES

FIELD OF DISCLOSURE

This invention relates generally to digital printing systems, and more particularly, to devices and methods for marking substrates using a laser.

BACKGROUND

Laser marking/engraving devices generally use just one high powered laser (class 4) of a very small spot size, typically 1 to 10 nm spot size, which is then passed across a substrate, such as plastic or metal, either by the beam moving or the substrate moving to mark or engrave the material. While these systems provide a high powered, fine spot size, to mark with, they are not fast when a large amount of surface area must be marked. While the spot can be moved at a very fast rate of say, 12 meters per second by various means, it still takes a large amount of time to mark an area with a large solid area. For example, a 10 nm spot size being translated at a rate of 12 meters/second or 39.4 ft/sec. would take 12.9 minutes to mark completely a 1 square foot solid area (305×305 mm). This assumes the beam stays on and moves from side to side advancing the beam width after reaching the opposite side. Even if the beam is only marking 10% of the area, it would still take over one minute to mark/engrave the area. So even though these systems can produce a very high temperature spot, moving very fast, they still take considerable time to mark large areas. Thus, there remains a need for a faster system/method to mark/engrave media over current systems.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by a device for rapidly marking a substrate using a laser. The device comprises: a transport for conveying the substrate to be marked, wherein the substrate comprises a laser additive that photosensitizes the substrate; a laser that emits a line laser beam that is addressable at a pixel level and is positioned over the transport for directing the line laser beam at the substrate as the substrate moves on the transport, wherein the laser is synchronized with the transport movement to mark the substrate in a line by line pattern.

The foregoing and/or other aspects and utilities embodied in the present disclosure may also be achieved by providing a method for rapidly marking a substrate using a laser. The method comprises: conveying the substrate to be marked on a transport and wherein the substrate comprises a laser additive that photosensitizes the substrate; positioning a laser over the transport and synchronized with movement of the transport, wherein the laser directs a line laser beam at the substrate in a line by line pattern as the substrate passes thereunder, the laser line beam being addressable at a pixel level.

The foregoing and/or other aspects and utilities embodied in the present disclosure may further be achieved by a device for rapidly embedding a marking within an optically clear substrate using a laser. The device comprises: a transport for conveying the substrate to be marked, wherein the substrate is optically clear; a laser that emits a line laser beam that is addressable at a pixel level and is positioned over the transport for directing the line laser beam at the substrate and focusing the line laser beam to generate sub-surface marking, as the substrate moves on the transport, wherein the laser is synchronized with the transport movement to generate the sub-surface mark in a line by line pattern.

The foregoing and/or other aspects and utilities embodied in the present disclosure may even further be achieved by providing a method for rapidly embedding a marking within an optically clear substrate using a laser. The method comprises: conveying the substrate to be embeddedly marked on a transport, and wherein the substrate is optically clear; positioning a laser over the transport and synchronized with movement of the transport, the laser directs a line laser beam at the substrate and focuses the line laser beam to generate sub-surface marking, as the substrate moves on the transport, the laser being synchronized with the transport movement to generate the sub-surface mark in a line by line pattern, the laser line beam being addressable at a pixel level.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
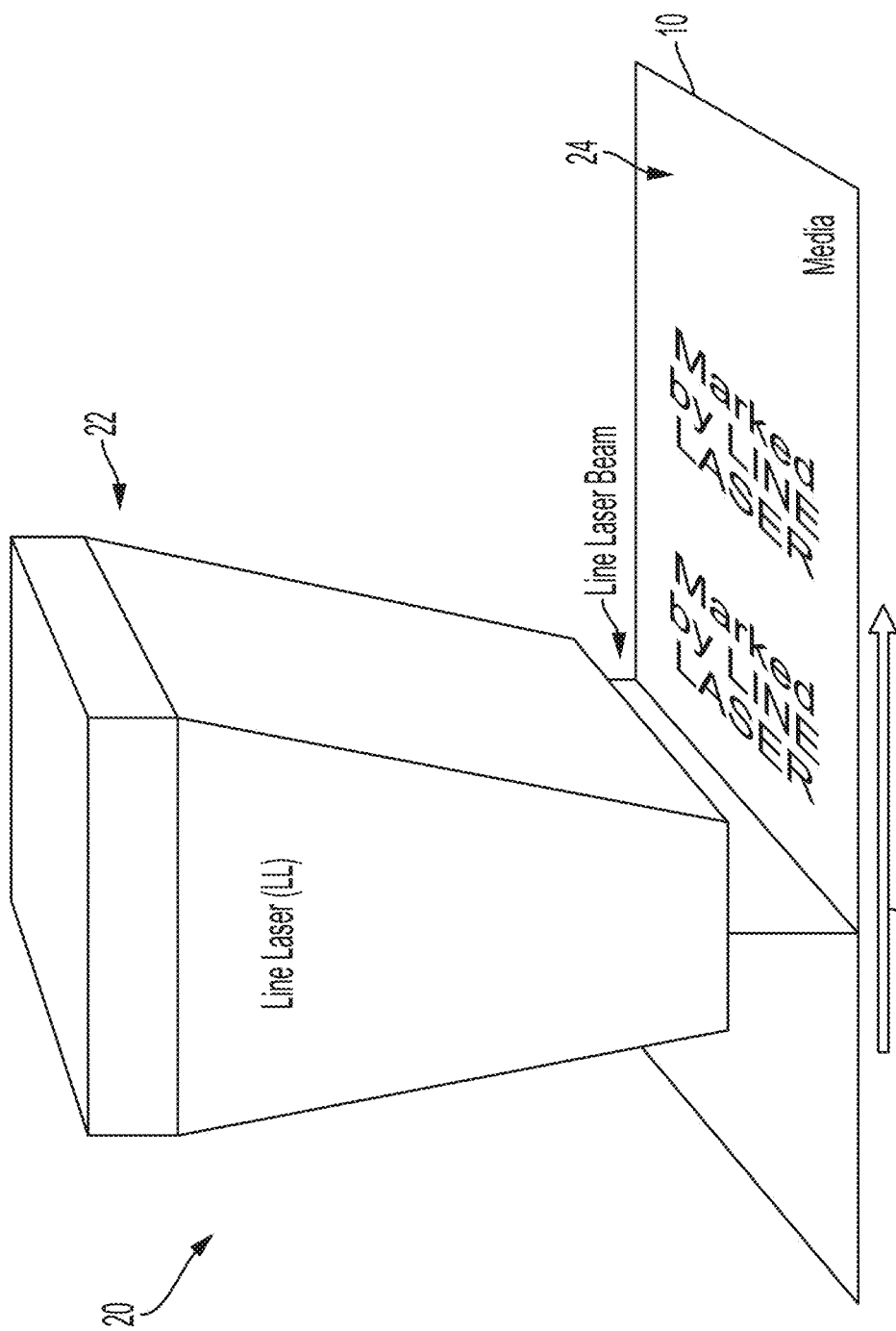
FIG. 1 is an isometric diagram of the system and method of the present invention.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for inking from an inking member to the reimageable surface of an imaging member.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The term "controller" or "control system" is used herein generally to describe various apparatus such as a computing device relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a controller, computer, computing platform, computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "media", "print media", "print substrate" and "print sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, and foils, as readily understood by a skilled artisan.

The term "image forming device", "printing device" or "printing system" as used herein may refer to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and the like, and is any machine that reads marks on input sheets; or any combination of such machines.

This present invention 20 (FIG. 1) involves using a "line laser" for use in laser marking. As used throughout this Specification, a line laser comprises a source of radiant energy capable of illuminating a line on a surface for imaging purposes. Typically, the line laser is moved relative to a surface desired to be marked, in a direction perpendicular to the illuminated line. Moreover, the term "marking" as used throughout this Specification is defined as using radiant energy to change the color of a portion of a surface, such as can be done, for example, with certain types of polymer materials; the term "marking" shall also include "etching" by which is meant changing the color of a surface by using radiant energy to ablate a top layer of a surface.

Figure 2:
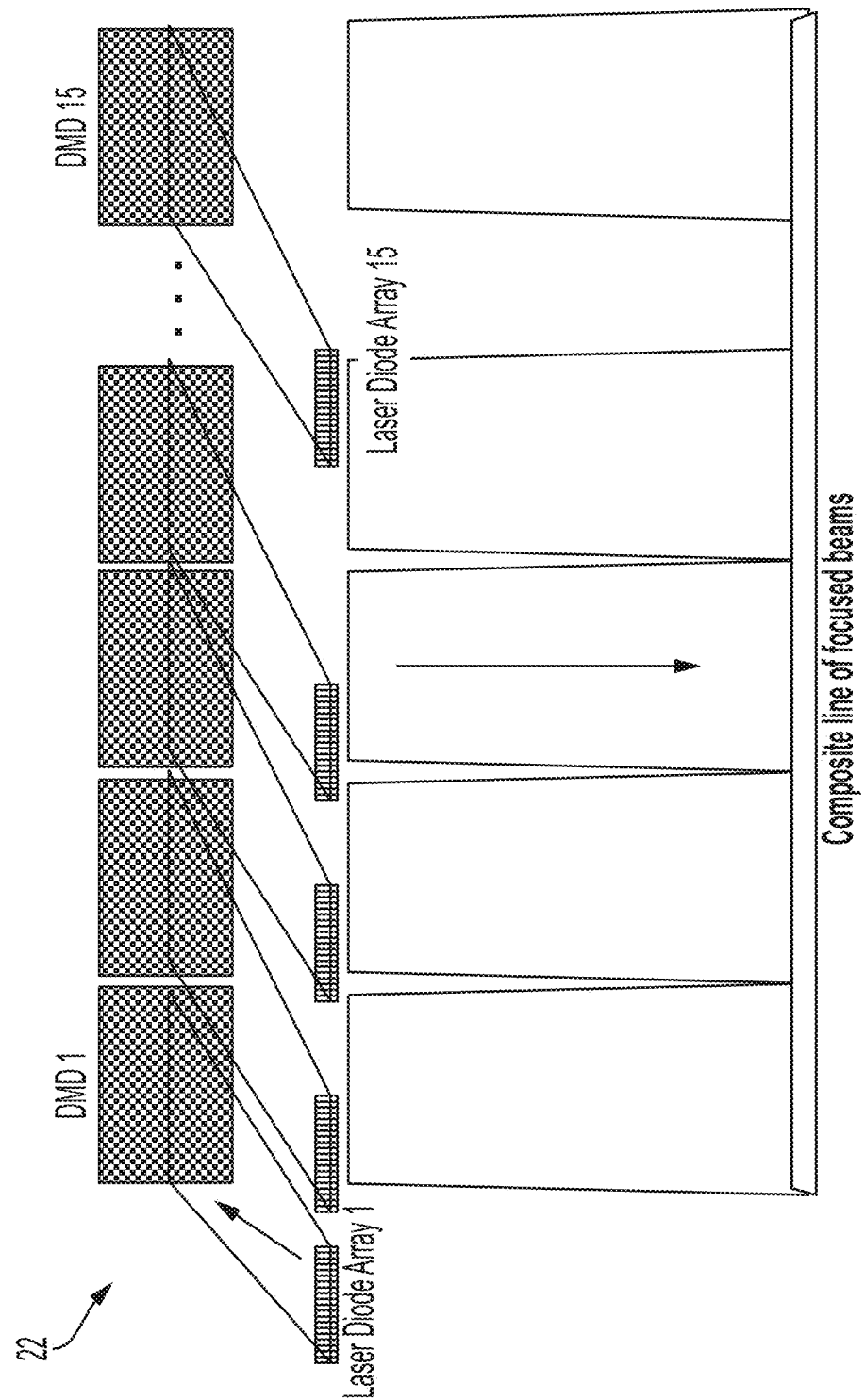
FIG. 2 is a functional diagram of the line (beam) laser of the present invention.

The line laser 22 is a class 4 (the highest power level for lasers) device using a plurality (e.g., 15) laser diode arrays (LDA) each coupled with a corresponding plurality (e.g., 15) digital micro-mirror devices (DMD) to produce a line of laser energy having a length in the range of 0.75 inches-20 inches and having a width in the range of 10 μm-300 μm, simultaneously. See FIG. 2. By way of example only, the input power range is 10 to 200 Watts per LDA or line laser module. As such, combining a plurality (e.g., 15) LDAs at the range per module rating forms a 15×10 and 15×200 watts range which corresponds 150 to 3000 watts total for all LDAs combined.

Figure 3:
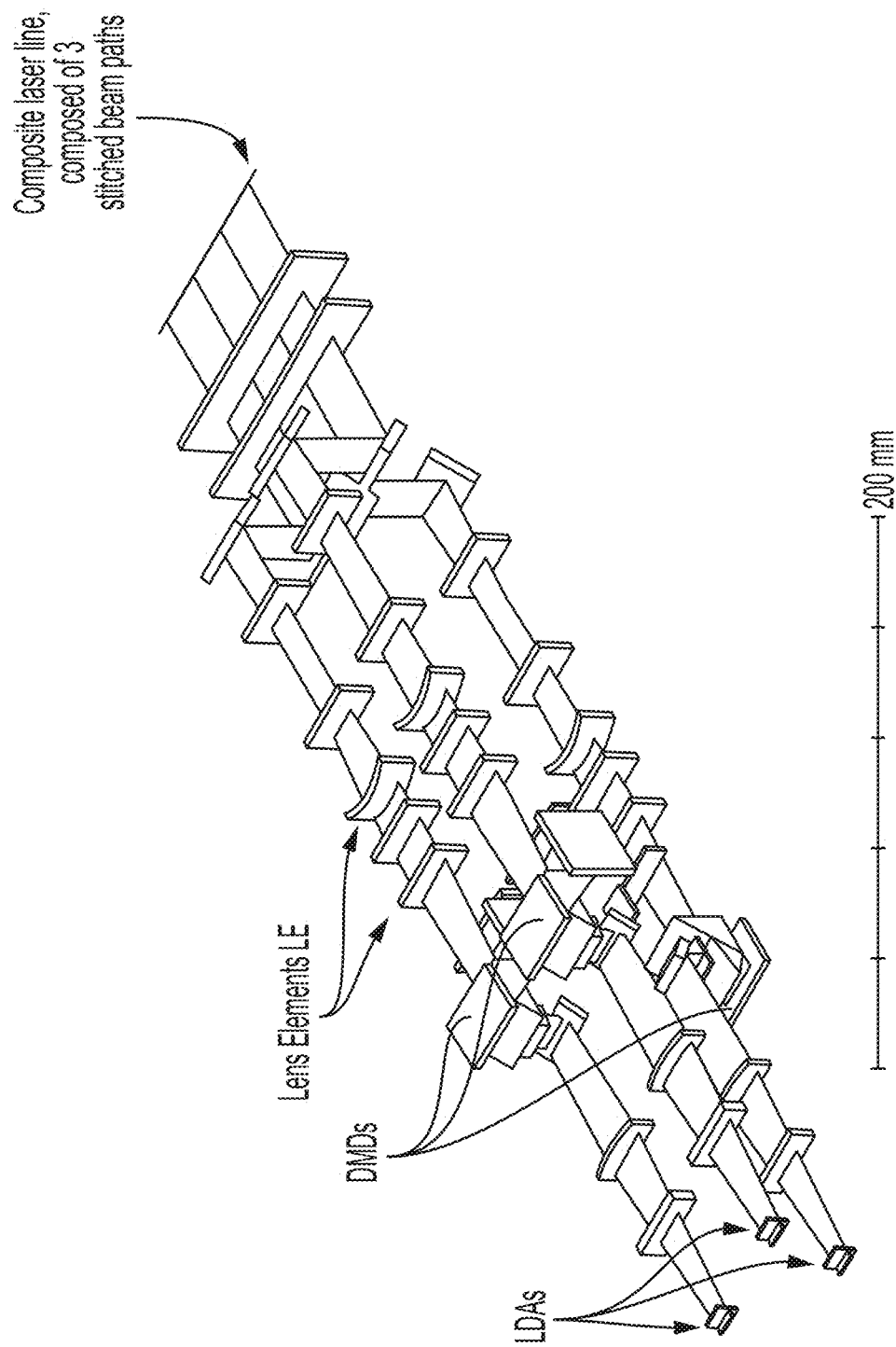
FIG. 3 is another functional diagram of a portion of the line laser showing the spatial relationship of the laser diode array (LDA), the digital micro-mirror devices (DMD) and lens elements to form a portion of the overall line laser output.

FIG. 3 shows only a portion of the LL 22 and, in particular, the spatial relationship of the LDAs, DMDs and lens elements LE for projecting a segment of a scan line of imaging data. As mentioned previously, the DMDs comprise an array of mirrors that deflect in response to a command from an internal controller (not shown). Lens elements LE project the scan line. Each LDA forms an imaging module that provides imaging capability for approximately one inch (1") in the transverse direction, as shown in FIG. 1. A corresponding LDA illuminates a corresponding DMD. The DMD is similar to what is commonly used in computer projectors and some televisions. The LDAs provides constant illumination to the DMDs. Each DMD deflects individual mirrors to form the pixels on the substrate/media 10. Thus, a single imaging beam path (e.g., one of three beam paths shown in FIG. 3) simultaneously images a one inch (1") by one (1) pixel line of the image for a given scan line. If a pixel is not to be turned on, the mirrors for that pixel deflect such that the LDA illumination for that pixel does not hit the substrate/media 10, but goes into a chilled light dump heat sink (not shown). By using several imaging modules, comprising several LDAs and DMDs, each placed at individual zones adjacent to each other across from the imaging member to form a complete scanline of the image, a very wide cross-process width is achieved. Of course, the imaging modules need to be calibrated to each other to remove image alignment and uniformity defects between modules, very similar to modular printheads in ink jet printing. To improve the power consumption response of the imaging modules a controller (not shown) is provided for selectively powering the LDAs based on the content in a look-ahead buffer (not shown). Each DMD includes a semiconductor chip, in which several to hundreds of thousands to millions of driving micromirrors (cells) are integrated in a flat plate form. That is, the size of one cell is very small, which is determined by a micro unit. Typically, the DMD is operated in such a manner that it enlarges and projects light using an image signal inputted from a computer or other appliance. In addition, because such a micromirror device includes hundreds of thousands or millions of micromirrors for switching the paths of reflected beams no more than several times per sec to hundreds of thousands of times per sec, each of the micromirrors can control collected beams in a digital method. Typically, each of the micromirrors in the DMD is turned from one mechanical state or to another mechanical state by electric voltage, thereby being positioned in a desired orientation. See also U.S. Pat. No. 8,508,791 (Paul, et al.); U.S. Pat. No. 10,261,286 (Zirilli, et al.) and U.S. Pat. No. 10,594,887 (Calamita) for similar DMD technology.

The modulation of the laser line array is done via the DMD devices mirrors and is addressable in the "x" and "y" dimensions. The line laser 22 does not concentrate all of its laser energy into one small area, such as the previously mentioned 10 μm spot, but spreads it across a simultaneously addressable line. This gives the line laser 22 a lower power per equal spot size, but faster time to cover a large surface area, as it only has to be translated in one direction. So, given a media that does not need super intensity, but still needs high intensity, the line laser 22 is advantaged for speed.

Due to the fact that the line laser 22 does not have the same intensity as other marking lasers, the present invention also involves using a laser additive to the intended substrate or surface to be marked. By using a laser additive, commercially available or otherwise, which is tuned to the wavelength of the line laser, the power requirement to mark the substrate is reduced. The term "tuned" implies that that the additive used must match the wavelength used in the laser, or at least be partially sensitive to the laser wavelength used; so while a laser additive may have a peak absorption at a specific wavelength, it can still have high sensitivity at wavelength around the peak wavelength. It is the combination of the line laser's 22 wide swath (>305 mm) and the improved media/surface sensitivity to laser wavelength, which allows the line laser 22 marking system to achieve faster marking than other systems. This invention comprises mounting the line laser ("LL") 22 over a moving belt which holds the sensitized, substrate/media 10, which transports the media past the LL 22 for marking, FIG. 1 (transport belt not shown), in the direction 23 shown in FIG. 1. As the media 10 is moved past the LL 22, the desired image is projected from the LL 22 line by line in synch with the moving media. Once the media has translated through the line of laser energy of the LL 22, the marking is complete, there is no other processing or fixing needed of the image. In this case, the media 10 has been physically altered via the heat generated by the line of laser energy interacting with the photosensitized media and is permanent. A second method would use a photosensitizing agent 24 coated on top of the media 10 to be marked. The result of either method is a substrate/media 10 that has been marked in a permanent fashion via: foaming, melting, carbonizing or chemical/molecular alteration which is permanent.

The present invention uses the LL 22 which has greater than 100 watts of input power per laser or greater than 1500 watts for the aggregate beam. The LL 22 line of laser energy width is approximately 12 inches in length (305 mm) and ~140 μm in width. As mentioned previously, this is achieved by using 15 laser diode arrays (line lasers) reflected off a plurality (e.g., 15) Digital Micro Mirror Devices (DMDs) which are critically aligned to produce one continuous line laser that is addressable at the pixel level. Because the LL 22 has an addressable image path, it allows the projecting of 2D images such as pdf files, jpgs or other graphic file formats in a line by line fashion. It is important to note that the entire 12 inches (305 mm) by 140 nm beam is projected at the same time and patterns the image that is loaded into the plural DMDs simultaneously. This results in the media being imaged/exposed in the time it takes to pass the media under the 12 inch swath of laser irradiance. In the original use of the LL 22, the LL printer has demonstrated speeds of 1.6 meters per second. This speed is far faster than any current fiber, spot laser engraver or similar system. When used for marking, the LL 22 may not be able to achieve these speeds due to lack of laser intensity, but it is not limited by its architecture like spot lasers. As mentioned above, the spot laser moving at its fastest speed cannot cover the area of the LL 22 at any comparable speed. It should also be noted, that there are other DMD imaging devices that use lasers, none though, have the intensity of the LL 22. To the best of the inventors' knowledge, the LL 22 is currently the highest power, matrix addressable, line laser available. Coupling the LL 22's addressable power with a media that has laser additives to photosensitize the media allows for the marking of items at a scale that has not been achieved before. As such, the LL 22 marker printer of the present invention opens a new market of marking.

While the system of the present invention is capable of engraving as the term is generally accepted, as related to lasers (oxidation, carbonization or ablation), that is not where its advantage is as it would not be faster than equally powered spot lasers as the LL 22 would have to slow down to get the same spot power. Again, the LL 22 is a line laser—it spreads its power out to cover a wide area fast. The advantage of the system 20 of the present invention is in adding laser additives 24 or other photosensitizing materials 24 to a media or substrate to allow for faster marking of the media that take advantage of LL 22's large swath of simultaneous beam. To harness LL 22's power, laser additives 24 are introduced into the intended marking media (e.g., blended into the polymer used as the media, or applied to the top layer of the media surface) at the time of the master batch manufacture for later use in making sheet plastics. Alternatively, the additives 24 could be added to a coating that is used to overcoat the media that is to be marked. The current LL 22 may operate using any wavelength from the ultraviolet to infrared wavelengths, such as 300 nm-2000 nm based on DMD wavelength specifications and with the understanding that the laser additive used works at the selected laser wavelength. By way of example only, the LL 22 may operate using a peak wavelength of 1035 nm, so any additives 24 would be tailored to be at this wavelength. The additives 24 work by absorbing the energy of the 1035 nm wavelength, or whatever wavelength they are tailored to, causing heat and/or a chemical change when exposed to the tailored wavelength, whereby the reaction can cause foaming, discoloration, carbonization and even ablation of the substrate-etching. The nature of the marking is dependent in part on how much laser power is used. For the purposes of speed, it would be best to mark at the color change level versus the ablation or engraving level, as the discoloration method would require less dwell time thereby speeding the process up. The result of this laser marking is a very permanent mark that is more durable than other methods especially in the case where the mark is embedded or part of the material. Exemplary laser additives for use in the present invention 20 are: ONCAP® sold by PolyOne Corporation, CHROMARK® sold by Chroma Color Corporation, BLI2280MPOLYBLKMB LazAct Black Masterbatch laser additive, sold by Brilliance Laser Inks, and others. Whichever company makes the additives or coatings, including the Assignee of the present application, namely, Xerox, the thrust is to engineer the fastest marking time via specific additives 24 that are optimized to absorb/react with the LL 22 wavelength. This optimization could also employ changing the LL diode arrays to a different frequency so as to match a more suitable photosensitizer.

It should be noted that although the user of laser additives are known, to the best of the inventors' knowledge, there is no teaching or suggestion of using laser additives with line lasers in the configuration disclosed herein. Moreover, these laser additives do not need to be removed in the LL process as they can only be acted upon by the intense power and wavelength of the LL 22 and should be stable otherwise.

As mentioned previously, two methods of marking mentioned are via (1) a top coating 24 over a substrate 10 and (2) a substrate 10 with no top coat but sensitized to the laser wavelength within the substrate 10 itself. Both methods would use a pre-manufactured substrate 10 of either top coated or homogeneous design. The homogeneous media would allow marking below the top surface whereas the top coating would only allow the top coat to be marked.

To take advantage of LL 22's speed in covering a large surface area with high intensity, this present invention 20 involves using a timed transport belt whereby the lead edge of the media 10 is either known or sensed and moving that media at a speed that correlates with the speed of the LL 22 imaging. The motion of the translated media 10 could either be stepped or continuous. An example of the stepped laser would be stepping the media 10 in relation to the beam imaging width. If the beam with is 140 μm wide, then the media 10 could be stepped at 140 μm increments to correlate to the beam width. The DMD's could also load a new image if needed for the new stepped-to area. In the case of continuous media movement, no stepping, the DMD's would change images at a rate that corresponded to the speed of the media 10 so as to produce a sharp mark. These methods of modulating irradiance would employ the techniques currently used by the LL process such as image scrolling, non-scrolling and future techniques. Scrolling is where the image is scrolled on the DMD at the rate of the media translation. The exception to the LL process, DMD laser modulation practices, would be in the case of the stepped media translation. The current LL process has no stepped printing as its process is dependent on a continuous motion. The process here would not be limited to continuous motion but could employ a stepped motion as previously mentioned or in some form thereof. For example, the media 10 could be stepped at increments of 100 μm while the beam width remains at 140 μm. Such a step rate could help mitigate gaussian properties of the beam width. While at this point only specific beam widths have been mentioning the LL 22 is not limited to those numbers. More typical of the LL 22 is a spot size or ~21 μm (obtained by patterning DMD) which corresponds to a resolution of 1200 dpi. So whatever mode is used for DMD laser modulation, the belt or transport that translates the media is able to follow the same method or pattern by being synched to the LL 22.

Another method of marking employs focusing the laser at a level lower than the surface of the media 10, this allows the marking to happen within the media for embedded marking. For this method to work, the LL 22 needs to be focusable and the media 10 needs to be optically clear to the marking method. The LL 22 is very well suited to this as it has a very defined focus point even though it uses lasers that are columnated. Because the LL 22 has a defined focus point the system proposed here would have a "z" axis that would allow specific focusing of the LL 22 which also would allow sub-surface marking.

In summary the system and method of the present invention 20 involves combing the LL 22 with tailored substrates in a synchronous, mechanized transport for faster marking of materials.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A device for rapidly marking a substrate using a laser, said device comprising:
a transport for conveying the substrate to be marked, said substrate comprising a laser additive that photosensitizes said substrate;

a laser that emits a line laser beam that is addressable at a pixel level and is positioned over the transport for directing said line laser beam at said substrate as the substrate moves on said transport, said laser being synchronized with said transport movement to rapidly mark said substrate in a line by line pattern.

2. The device of claim 1 wherein said laser comprises a plurality of laser diode arrays that are reflected off of a corresponding plurality of digital micro mirror devices to generate said laser line beam.

3. The device of claim 2 wherein said plurality of laser diode arrays comprises fifteen laser diode arrays and said corresponding plurality of digital micro mirror devices comprises fifteen digital micro mirror devices.

4. The device of claim 2 wherein said each one of said plurality of laser diode arrays has in the range of 10 watts-200 watts of input power.

5. The device of claim 1 wherein said line laser beam is addressable in x and y dimensions.

6. The device of claim 1 wherein said line laser beam comprises a line length in the range of 0.75 inches-20 inches and a line width in the range of 10 µm-300 µm.

7. The device of claim 1 wherein said laser operates using a wavelength in the range of 300 nm-2000 nm.

8. The device of claim 1 wherein a surface of said substrate is treated with a surface coating comprising said laser additive prior to conveying said substrate on said transport, said surface coating being marked by said line laser.

9. The device of claim 1 wherein said substrate is formed with said laser additive therein, prior to conveying said substrate on said transport, said substrate being marked by said laser below a top surface of said substrate.

10. A method for rapidly marking a substrate using a laser, said method comprising:
  conveying said substrate to be marked on a transport and wherein said substrate comprises a laser additive that photosensitizes said substrate;
  positioning a laser over said transport and synchronized with movement of said transport, said laser directing a line laser beam at said substrate in a line by line pattern as said substrate passes thereunder to rapidly mark said substrate, said laser line beam being addressable at a pixel level.

11. The method of claim 10 further comprising the step of treating said surface of said substrate with a surface coating comprising said laser additive prior to conveying said substrate on said transport and wherein said laser marks said surface coating.

12. The method of claim 10 further comprising the step of forming said substrate with said laser additive therein prior to conveying said substrate on said transport and wherein said laser marks said substrate below a surface of said substrate.

13. The method of claim 10 wherein said step of positioning said laser comprises providing a plurality of laser diode arrays that are reflected off of a corresponding plurality of digital micro mirror devices to generate said laser line beam.

14. The method of claim 13 wherein said plurality of laser diode arrays comprises fifteen laser diode arrays and said corresponding plurality of digital micro mirror devices comprises fifteen digital micro mirror devices.

15. The method of claim 13 wherein said each one of said plurality of laser diode arrays has in the range of 10 watts-200 watts of input power.

16. The method of claim 10 wherein said line laser beam is addressable in x and y dimensions.

17. The method of claim 10 wherein said line laser beam comprises a line length in the range of 0.75 inches-20 inches and a line width in the range of 10 µm-300 µm.

18. The method of claim 10 wherein said laser operates using a wavelength in the range of 300 nm-2000 nm.

19. The method of claim 10 wherein movement of said transport comprises stepped motion.

20. The method of claim 19 wherein said stepped motion is defined by a width of said line laser beam.

21. The method of claim 10 wherein movement of said transport is continuous and wherein said line laser beam comprises image scrolling.

22. A device for rapidly embedding a marking within an optically clear substrate using a laser, said device comprising:
  a transport for conveying the substrate to be marked, said substrate being optically clear and said substrate comprising a laser additive that photosensitizes said substrate;
  a laser that emits a line laser beam that is addressable at a pixel level and is positioned over the transport for directing said line laser beam at said substrate and focusing said line laser beam to generate sub-surface marking, as the substrate moves on said transport, said laser being synchronized with said transport movement to rapidly generate said sub-surface mark in a line by line pattern.

23. A method for rapidly embedding a marking within an optically clear substrate using a laser, said method comprising:
  conveying said substrate to be embeddedly marked on a transport, said substrate being optically clear and said substrate comprising a laser additive that photosensitizes said substrate;
  positioning a laser over said transport and synchronized with movement of said transport, said laser directing a line laser beam at said substrate and focusing said line laser beam to generate sub-surface marking, as said substrate moves on said transport, said laser being synchronized with said transport movement to rapidly generate said sub-surface mark in a line by line pattern, said laser line beam being addressable at a pixel level.

* * * * *